April 29, 1941.    N. LOESEL    2,239,725
SPOOL
Filed May 12, 1938
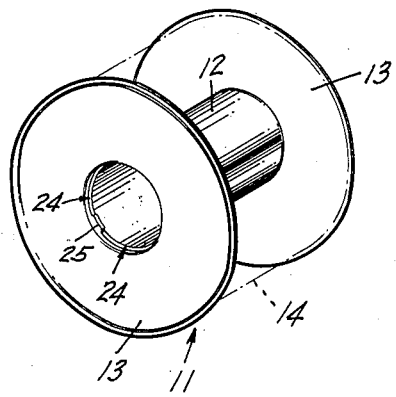
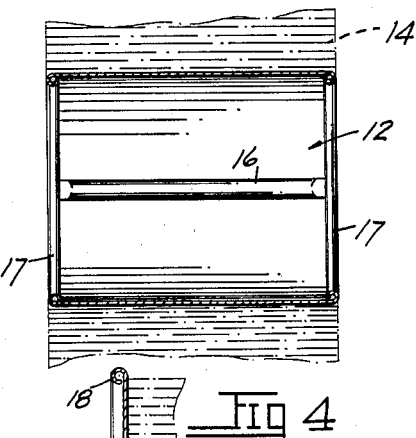
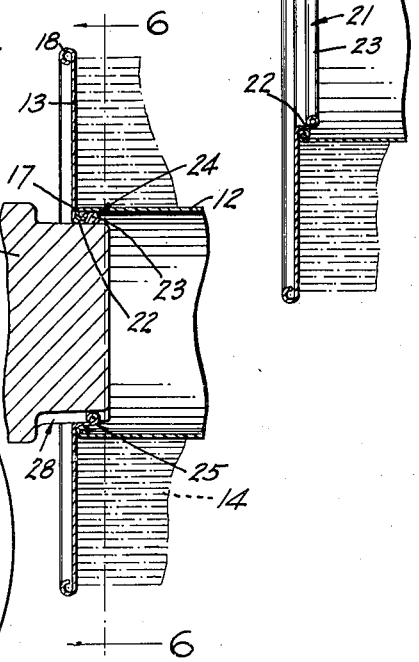
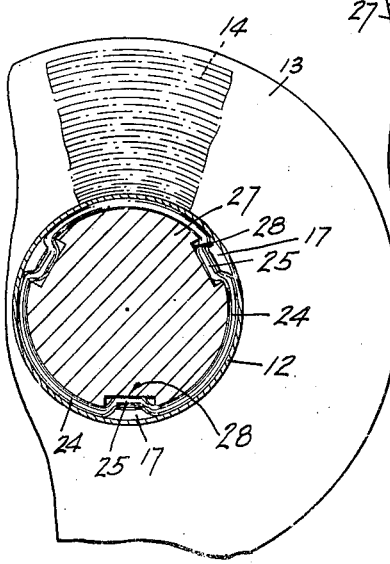
INVENTOR.
Nicholas Loesel
BY
ATTORNEYS Patented Apr. 29, 1941

2,239,725

UNITED STATES PATENT OFFICE 2,239,725

SPOOL

Nicholas Loesel, Richmond Hill, N. Y., assignor to American Can Company, New York, N. Y., a corporation of New Jersey Application May 12, 1938, Serial No. 207,600

3 Claims. (Cl. 242—123)

The present invention relates to improvements in sheet metal spools such as are used for adhesive tape and the like and has particular reference to a spool construction and to the method of easily and economically assembling the spool parts into a unitary structure which cannot be pulled apart under the strain of normal handling conditions.

A modern manner of winding adhesive tape or a similar product upon spools is to wind the tape upon the core piece of the spool before the spool heads are assembled to the core. In practicing this method a plurality of cores are slipped in close contact with each other upon a common winding shaft. A web of adhesive tape of a width equal to the combined length of the plurality of cores on the winding shaft is then wound directly upon the combined core pieces and slit into as many widths as there are core pieces. The core pieces with the proper width of tape wound upon them are then taken off the winding shaft and the spool heads are then applied to each individual filled core.

It is the object of the present invention to provide a spool construction and a method of assembling the spool heads to the core pieces which is peculiarly adapted to the aforementioned method of tape winding.

An object of the invention, therefore, is the provision of a tubular core piece having inwardly curled annular end edges and spool heads having central curled flanges adapted to frictionally fit within said core edge in initially assembled position and then to be reformed and forced into permanent engagement with said curled core edges.

Another object of the invention is the provision of a novel method of assembling the aforementioned spool heads and spool core pieces in permanent and secure engagement in an economical manner and by a simple plunger die mechanism.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a sheet metal spool assembled according to the method steps of the instant invention, the product on the spool being indicated in broken lines;

Fig. 2 is an enlarged section of the spool core with a fragment of the product indicated in place thereon;

Fig. 3 is an enlarged section of one of the spool heads;

Fig. 4 is an enlarged sectional view of a spool head in place relative to an end of the core before being united therewith, part of the core being broken away;

Fig. 5 is a view similar to Fig. 4, the view illustrating a spool head and the core being secured together, the view also showing part of the apparatus for effecting this step of the method, parts of the core and the apparatus being broken away; and Fig. 6 is a sectional view taken substantially along the line 6—6 in Fig. 5.

As a preferred embodiment of the invention the drawing illustrates a sheet metal spool 11 (Fig. 1) comprising a tubular body or core 12 having circular spool heads 13 tightly secured to its opposite ends. The assembled spool preferably carries its product, herein shown as a roll of adhesive tape and indicated by the broken lines 14. This tape is preferably wound on the core before the spool ends are assembled therewith.

The core 12 is preferably made from a flat blank of sheet metal which is bent into tubular shape and which has its adjacent marginal or edge portions embodied in a suitable joint such as a lock and lap side seam 16 (Fig. 2), although the core may be made in any other manner if desired. The marginal portions adjacent each end of the core may be bent inwardly in a curl 17 of substantially circular cross-section. This provides a smooth curled edge at each end of the core.

The spool heads 13 may be struck out of one piece of sheet metal in any suitable manner. The outer edge of the head is curled inwardly as at 18. At its geometrical center the spool head is provided with an opening 21 which is surrounded by a laterally extended annular flange 22. This flange is dimensioned so that it will fit snugly into a curled end of the core 12. Flange 22 terminates in an inwardly bent head curl 23 of substantially circular cross-section.

In carrying out the method steps of the invention, the heads 13 are placed on the ends of the core 12 with the head flanges 22 inserted into the core ends and engaging the in-turned curls 17 of the core. This initial assembly position of head and core is shown in Fig. 4.

With the heads and core in this partially assembled position, the head curls 23 on the flange 22 are reformed or displaced and forced outwardly, preferably at equally spaced intervals around the flange, thereby producing a plurality of spaced indentations 24 (Figs. 1 and 5) separated by unbent portions 25. At each indentation 24 the head curl section 23 is tucked back and under the adjacent curl 17 of the core 12 as shown in Fig. 5.

While this tucking-in of the head flange curl 23 at intervals has been described as preferred exemplary method, it is quite obvious that the curl 23 may be tucked-in or displaced all around, in which case the unbent portions 25 would be entirely eliminated and the mechanism for performing the tucking-in operation would be correspondingly modified.

This tucking-in of the head curl 23 thus crimps the same tightly against the core curl 17 so that the spool head is permanently secured to the core and so held will resist any normal strain which may be put on the spool heads. This manner of securing the heads to the core also results in a smooth edge at the uniting joint so that the fingers may be inserted in the core without danger of cutting as when unwinding the tape from the spool.

The tucking-in operation of the head curl sections 23 may be effected in suitable manner as by means of a tapered plunger 27 (Figs. 5 and 6) which is provided with spaced longitudinal flutes 28 formed in the tapered surface thereof. In the embodiment herein disclosed there are three of these flutes, as shown in Fig. 6 of the drawing. If it is desired to unite the two spool heads and the core at one time two plungers will be used, one for each end of the spool. The plungers need be merely forced into the openings 21 in the spool heads simultaneously and immediately withdrawn thereby performing the uniting operation in a rapid and efficient manner.

If it is desired to tuck the head curl 23 under the core curl 17 all around, the tapered plunger or chuck 27 would of course be formed without the recesses or flutes 28.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. A sheet metal spool comprising a tubular core having an end thereof bent inwardly to provide an internal curl which is substantially circular in cross section, and a spool head having a central opening defined by an axially extending flange having tight engagement inside of said core curl, the inner end of said flange terminating in a head curl of substantially circular cross section, said head curl extending first outwardly and thence inwardly relative to the axis of the core and interlocked with said core curl to permanently unite said head with said core.

2. A sheet metal spool comprising a tubular core having one end bent inwardly to provide a curl which is substantially circular in cross section, and a spool head having a central opening bounded by a laterally extending flange having tight engagement inside of said core curl, the inner edge of said flange having an inward head curl also of circular cross section, parts of which are displaced under the curl of said core to provide a permanent union therewith.

3. A sheet metal spool comprising a tubular core having its ends formed in inward curls, and spool heads secured to said core, each spool head having a flange which projects inside of the curl of said core and which is formed in an inward head curl, spaced portions of which are engaged under the curl of said core as holding indentations, the length of each indentation being greater than each intermediate space between indentations.

NICHOLAS LOESEL.